United States Patent
Ebisuno

(10) Patent No.: US 9,413,167 B2
(45) Date of Patent: Aug. 9, 2016

(54) PANEL FOR DISPLAY DEVICE, DISPLAY DEVICE, AND METHOD FOR TESTING PANEL FOR DISPLAY DEVICE

(71) Applicant: JOLED INC., Tokyo (JP)

(72) Inventor: Kouhei Ebisuno, Kyoto (JP)

(73) Assignee: JOLED INC., Tokyo (JP)

( * ) Notice: Subject to any disclaimer, the term of this patent is extended or adjusted under 35 U.S.C. 154(b) by 167 days.

(21) Appl. No.: 14/483,159

(22) Filed: Sep. 11, 2014

(65) Prior Publication Data

US 2015/0091444 A1    Apr. 2, 2015

(30) Foreign Application Priority Data

Oct. 1, 2013  (JP) ................. 2013-206844

(51) Int. Cl.
| | | |
|---|---|---|
| G02F 1/1333 | (2006.01) | |
| G02F 1/136 | (2006.01) | |
| H02H 9/04 | (2006.01) | |
| G09G 3/00 | (2006.01) | |
| H05B 33/08 | (2006.01) | |
| G09G 3/32 | (2016.01) | |

(52) U.S. Cl.
CPC ............. *H02H 9/044* (2013.01); *G09G 3/006* (2013.01); *H05B 33/0896* (2013.01); *G09G 3/3233* (2013.01); *G09G 2300/0861* (2013.01); *G09G 2330/08* (2013.01)

(58) Field of Classification Search
CPC ............ G02F 1/136204; G02F 1/1345; G02F 2001/136254; G02F 1/13452; G02F 1/1368; G02F 1/136213; G02F 1/136227; G02F 1/136286; H01L 27/12; H01L 27/1214
USPC ........................................ 349/40, 42, 43, 46
See application file for complete search history.

(56) References Cited

U.S. PATENT DOCUMENTS 6,104,449 A * 8/2000 Takahashi ......... G02F 1/136204
349/40
2009/0121227 A1* 5/2009 Itoh ..................... H01L 27/1288
257/59

FOREIGN PATENT DOCUMENTS

JP        11-142888        5/1999

* cited by examiner

*Primary Examiner* — Mike Qi
(74) *Attorney, Agent, or Firm* — Greenblum & Bernstein, P.L.C.

(57) ABSTRACT

A panel for a display device includes a display unit, an electrostatic protection wire, a wire being connected to the display pixels, an electrostatic protection circuit, and an electrostatic protection circuit control line. The display unit includes a plurality of display pixels. The electrostatic protection wire is connected to a test pad, the test pad being provided to receive a test signal. The electrostatic protection circuit connects the electrostatic protection wire and the wire connected to the display pixels. The electrostatic protection circuit includes a back-gate-type transistor that has a gate electrode, a drain electrode being short-circuited with the gate electrode, and a back-gate electrode. The electrostatic protection circuit control line includes a first end and a second end, the first end being connected to the back-gate electrode of the back-gate-type transistor.

13 Claims, 13 Drawing Sheets

PANEL FOR DISPLAY DEVICE, DISPLAY DEVICE, AND METHOD FOR TESTING PANEL FOR DISPLAY DEVICE

BACKGROUND OF THE DISCLOSURE

1. Field of the Disclosure

The present disclosure relates to a panel for a display device including organic electroluminescence (EL) elements, a display device, and a method for testing a panel for a display device.

2. Description of the Related Art

An organic EL display including organic EL elements is a known example of an image display device including current-driven light-emitting elements. The organic EL display has advantages of favorable viewing-angle characteristics and low power consumption.

The organic EL display includes an organic EL panel (display panel) including a glass substrate on which organic EL elements, wires, and so forth are formed, an integrated circuit (IC) for driving the organic EL panel, a control circuit, and so forth.

When organic EL displays are manufactured, organic EL panels are tested, after being manufactured, to determine whether or not the panels normally emit light. After the emission test, an IC is mounted on each organic EL panel. With the emission test being performed before mounting of an IC, the IC can be mounted on only non-defective organic EL panels. Accordingly, manufacturing yields can be increased. In other words, an unnecessary process of mounting an IC on a defective product can be reduced, and the manufacturing cost can be reduced. A method for an emission test of an organic EL panel is suggested in, for example, Japanese Unexamined Patent Application Publication No. 11-142888.

However, it is difficult to normally perform an emission test while achieving reduction of the occurrence of adverse effects during usual operation.

SUMMARY OF THE DISCLOSURE

Accordingly, the present disclosure provides a panel for a display device and a method for testing the panel in which an emission test can be normally performed and an increase in power consumption during usual operation can be suppressed.

Additional benefits and advantages of the disclosed embodiments will be apparent from the specification and figures. The benefits and/or advantages may be individually provided by the various embodiments and features of the specification and drawings disclosure, and need not all be provided in order to obtain one or more of the same.

A panel for a display device according to an aspect of the present disclosure includes a display unit, an electrostatic protection wire, a wire being connected to the display pixels, an electrostatic protection circuit, and an electrostatic protection circuit control line. The display unit includes a plurality of display pixels. The electrostatic protection wire is connected to a test pad, the test pad being provided to receive a test signal. The electrostatic protection circuit connects the electrostatic protection wire and the wire connected to the display pixels. The electrostatic protection circuit includes a back-gate-type transistor that has a gate electrode, a drain electrode being short-circuited with the gate electrode, and a back-gate electrode. The electrostatic protection circuit control line includes a first end and a second end, the first end being connected to the back-gate electrode of the back-gate-type transistor.

A comprehensive or specific aspect may be realized by a system, an integrated circuit, a computer program, or a computer-readable recording medium such as a compact disc read only memory (CD-ROM), or by a certain combination of a system, a method, an integrated circuit, a computer program, and a recording medium.

With the panel for a display device and the method for testing the panel according to the present disclosure, an emission test can be normally performed, and an increase in power consumption during usual operation can be suppressed.

DESCRIPTION OF THE PREFERRED EMBODIMENTS

Figure 1:
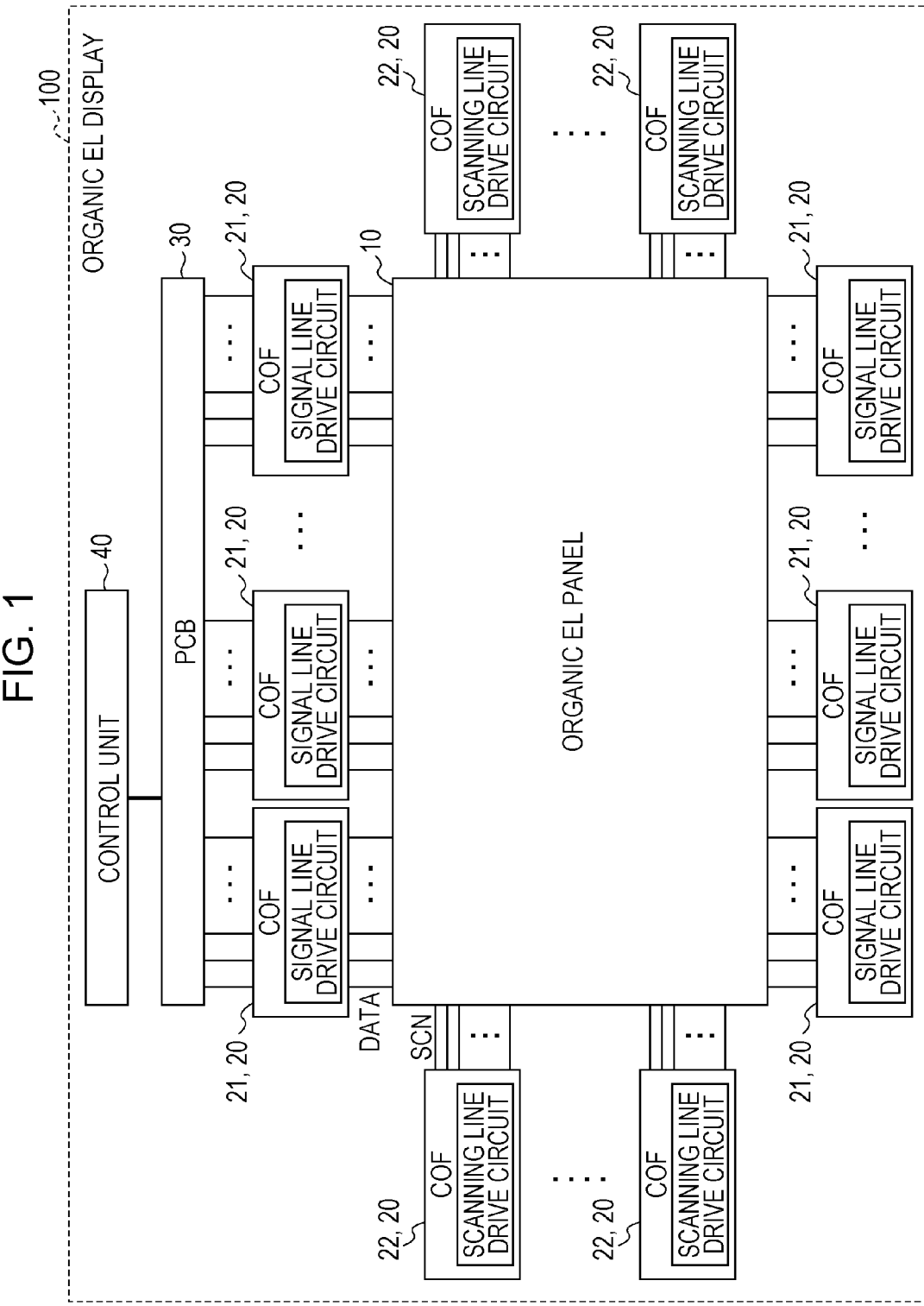
FIG. 1 is a block diagram illustrating an example of the configuration of a display device according to first to fourth embodiments.

In an emission test of an organic EL panel, it is necessary to input a signal from a test device because an IC has not been mounted on the panel. The following three methods may be used as a method for an emission test of an organic EL panel.

(1) A FullPin test device is used as a test device, and a signal is input by putting a tip of a needle on an IC mounting pad of an organic EL panel.

However, this method involves a problem that, particularly in a case where the organic EL panel is a large high-resolution panel, a test device for such a panel is very expensive or unavailable.

(2) A wiring pattern for short-circuiting a plurality of IC mounting pads of an organic EL panel and a test pad is formed on a glass substrate, and a signal is input by putting a tip of a needle on the test pad.

This method requires a small number of pads, and thus a test device is available with a relatively low cost. However, the wiring pattern that short-circuits the IC mounting pads and the test pad needs to be cut after an emission test. Thus, this method involves a problem that the number of steps of a manufacturing process increases.

(3) An electrostatic discharge (ESD) terminal (test pad) connected to an ESD element (high-resistance element) is provided on an organic EL panel, and a signal is input from the ESD terminal.

However, in the case of an emission test using an ESD element, if the resistance of the ESD element is higher than or equal to a certain value, a signal is not normally input, and the emission test is not normally be performed. This problem is remarkable particularly in a case where the resistance value of the ESD element increases due to manufacturing variations. Thus, it is required to decrease the resistance of the ESD element to perform an emission test.

However, if the resistance of the ESD element is decreased to be lower than or equal to a certain value, a leak current flowing via the ESD element increases during usual operation. The increase in leak current may cause an increase in power consumption of an IC, lack of write charging rate, and the occurrence of display variation due to an increase in delay of a signal waveform.

To solve the above-described problems, a panel for a display device according to an aspect of the present disclosure includes a display unit, an electrostatic protection wire, a wire being connected to the display pixels, an electrostatic protection circuit, and an electrostatic protection circuit control line. The display unit includes a plurality of display pixels. The electrostatic protection wire is connected to a test pad, the test pad being provided to receive a test signal. The electrostatic protection circuit connects the electrostatic protection wire and the wire connected to the display pixels. The electrostatic protection circuit includes a back-gate-type transistor that has a gate electrode, a drain electrode being short-circuited with the gate electrode, and a back-gate electrode. The electrostatic protection circuit control line includes a first end and a second end, the first end being connected to the back-gate electrode of the back-gate-type transistor.

The panel having the above-described configuration includes the back-gate-type transistor (for example, an ESD element) serving as the electrostatic protection circuit. Thus, a resistance value of the electrostatic protection circuit can be controlled by adjusting a voltage of the back-gate terminal.

Accordingly, for example, during an emission test, the resistance of the electrostatic protection circuit can be decreased so that a signal is normally input. During usual operation, the resistance of the electrostatic protection circuit can be increased so that the occurrence of leak current is suppressed. That is, with appropriate adjustment of the voltage of the back-gate terminal, two advantages: normal input of a signal during an emission test; and suppression of the occurrence of leak current during usual operation, can be obtained at the same time.

The above-described panel is not a display device, but is a panel on which an IC has not yet been mounted. Here, usual operation means operation in which video is displayed on the panel in a state where the panel is mounted in a display device.

In the panel having the above-described configuration, the wire is a wire to which a signal is input during usual operation, and is a wire other than an ESD wire. That is, the wire may be a signal line, a scanning line, a control line, or a plurality of lines among these lines.

For example, the back-gate-type transistor may be a bottom-gate-type transistor.

The panel having the above-described configuration includes the bottom-gate-type transistor as the back-gate-type transistor, and thus the configuration of device can be simplified and the manufacturing steps can be reduced.

For example, the panel may further include a back-gate pad being connected to the second end of the electrostatic protection circuit control line.

The panel having the above-described configuration includes the back-gate pad as a dedicated pad connected to the electrostatic protection circuit control line, and thus the electrostatic protection circuit can be properly controlled.

For example, the panel may further include a first resistance circuit that connects the back-gate pad and the test pad.

The panel having the above-described configuration includes the first resistance circuit that connects the back-gate pad and the test pad. Thus, troubles by a surge voltage are reduced in a case where a surge voltage is input during transportation of the panel.

For example, the second end of the electrostatic protection circuit control line may be connected to, during usual operation, a pad to which a certain voltage lower than a voltage of the wire being connected to the display pixels is applied.

According to the panel having the above-described configuration, the electrostatic protection circuit control line is connected to the pad to which the certain low voltage, for example, an initial voltage, is applied during usual operation. Thus, it is not necessary to provide a dedicated pad. Further, according to the panel having the above-described configuration, a low voltage is applied to the back-gate terminal during usual operation. Thus the resistance of the electrostatic protection circuit can be increased during usual operation. Also, according to the panel having the above-described configuration, a voltage from an existing power supply that supplies the certain low voltage is used, and thus it is not necessary to provide a dedicated power supply.

For example, the electrostatic protection wire is one of a plurality of electrostatic protection wires. In this case, the panel may further include a second resistance circuit that connects the plurality of electrostatic protection wires.

According to the panel having the above-described configuration, the electrostatic protection circuit is connected to the electrostatic protection wires that allow a surge voltage to escape, and the electrostatic protection wires are connected by the second resistance circuit. Accordingly, the capacitance of the electrostatic protection wires that allow a surge voltage to escape can be relatively increased. That is, in a case where a surge voltage is allowed to escape to a plurality of electrostatic protection wires in a distributed manner, compared to a case where a surge voltage is allowed to escape to one electrostatic protection wire, the display unit can be protected from the surge voltage more reliably.

For example, the display pixels may each include an organic electroluminescence element.

To solve the above-described problem, a display device according to an aspect of the present disclosure includes the panel having the above-described configuration.

The display device having the above-described configuration includes the above-described panel, and thus the resistance value of the electrostatic protection circuit can be controlled by adjusting the voltage of the back-gate terminal.

To solve the above-described problem, a method for testing a panel for a display device according to an aspect of the present disclosure is a method for testing the panel having the above-described configuration. The method includes steps of: (a) applying a back-gate voltage for an emission test to the back-gate electrode of the back-gate-type transistor; and (b) applying the test signal to the wire being connected to the display pixels.

With the above-described method, in the above-described panel, the voltage of the back-gate terminal is controlled by adjusting the voltage of the electrostatic protection circuit control line, and thus the resistance value of the electrostatic protection circuit can be controlled.

For example, in the applying step (a), a certain voltage higher than a voltage of the test signal being applied to the test pad may be applied to the electrostatic protection circuit control line as a voltage of the back-gate electrode.

According to the above-described method, a specific voltage setting can be obtained in which the resistance of the electrostatic protection circuit can be decreased during a test and the resistance of the electrostatic protection circuit can be increased during usual operation.

For example, the applying step (a) and the applying step (b) may be performed before an integrated circuit is mounted on the panel.

According to the above-described method, the panel can be tested after a scribing step (cutting step). Accordingly, if a defect occurs in the panel in the scribing step, the panel can be detected through screening.

These comprehensive or specific aspects may be realized by a system, an integrated circuit, a computer program, or a computer-readable recording medium such as a CD-ROM, or by a certain combination of a system, a method, an integrated circuit, a computer program, and a recording medium.

Hereinafter, embodiments will be described in detail with reference to the drawings.

Note that each of the embodiments described below represents a comprehensive or specific example. The values, forms, materials, elements, arrangement positions and connection forms of the element, steps, and order of the steps described in the following embodiments are examples, and do not limit the present disclosure. Among the elements described in the following embodiments, elements that are not described in a dependent claim representing the broadest concept are described as arbitrary elements.

First Embodiment

A panel for a display device, a display device including the panel, and a method for testing the panel according to a first embodiment will be described with reference to FIGS. 1 to 9.

1-1. Display Device

The configuration of the display device according to the first embodiment will be described with reference to FIGS. 1 to 4. The display device according to the first embodiment is an organic EL display.

FIG. 1 is a block diagram illustrating an example of the configuration of an organic EL display 100.

As illustrated in FIG. 1, the organic EL display 100 includes an organic EL panel 10A (10), chip on film (or chip on flexible: COF) circuits 20, a printed circuit board (PCB) 30, a control unit 40, and a power supply circuit (not illustrated).

The organic EL panel 10 is an example of a panel for a display device.

1-1-1. Configuration of Organic EL Panel (Panel for Display Device)

Figure 2:
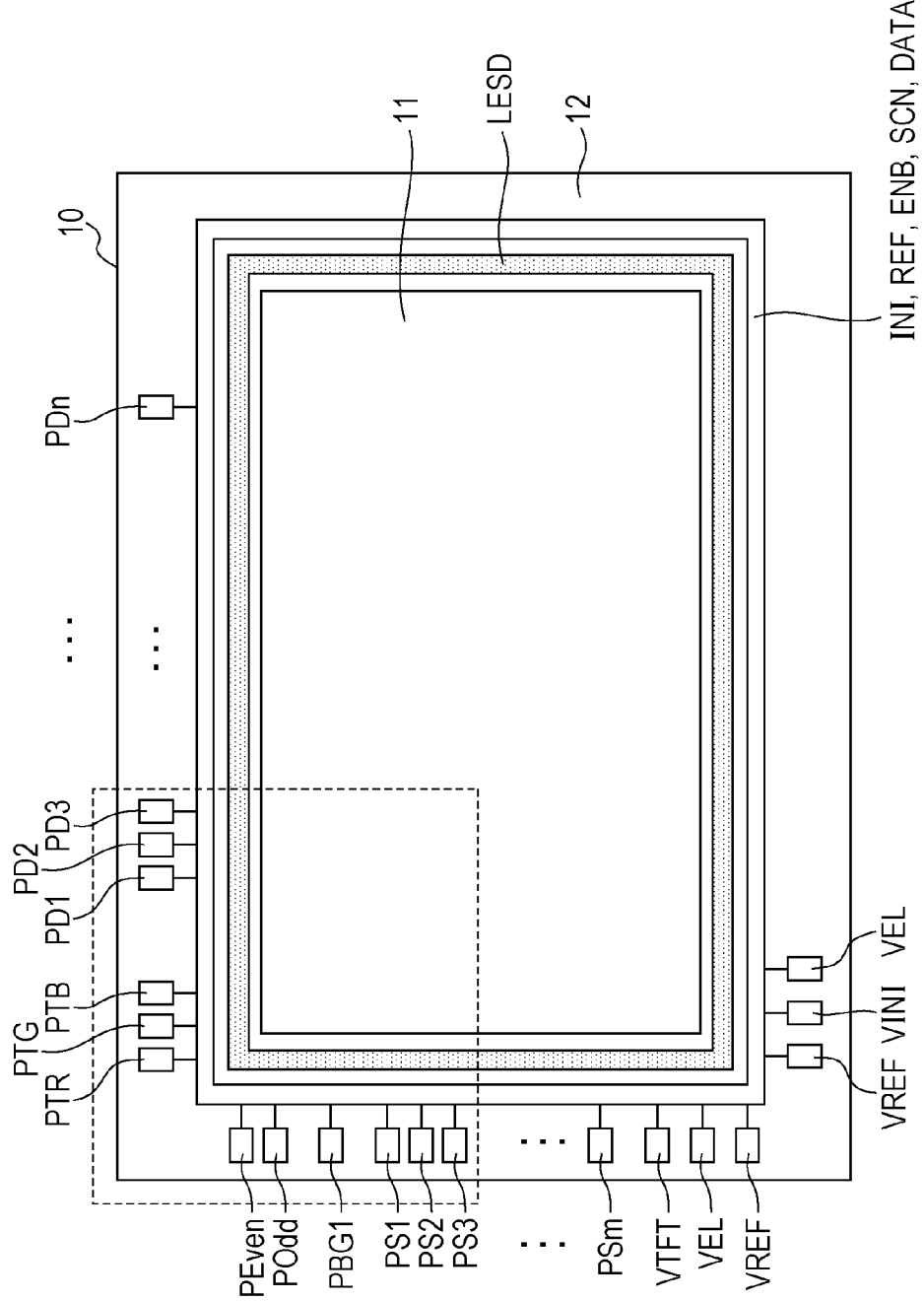
FIG. 2 is a diagram illustrating an entire panel for a display device according to the first to fourth embodiments.
Figure 3:
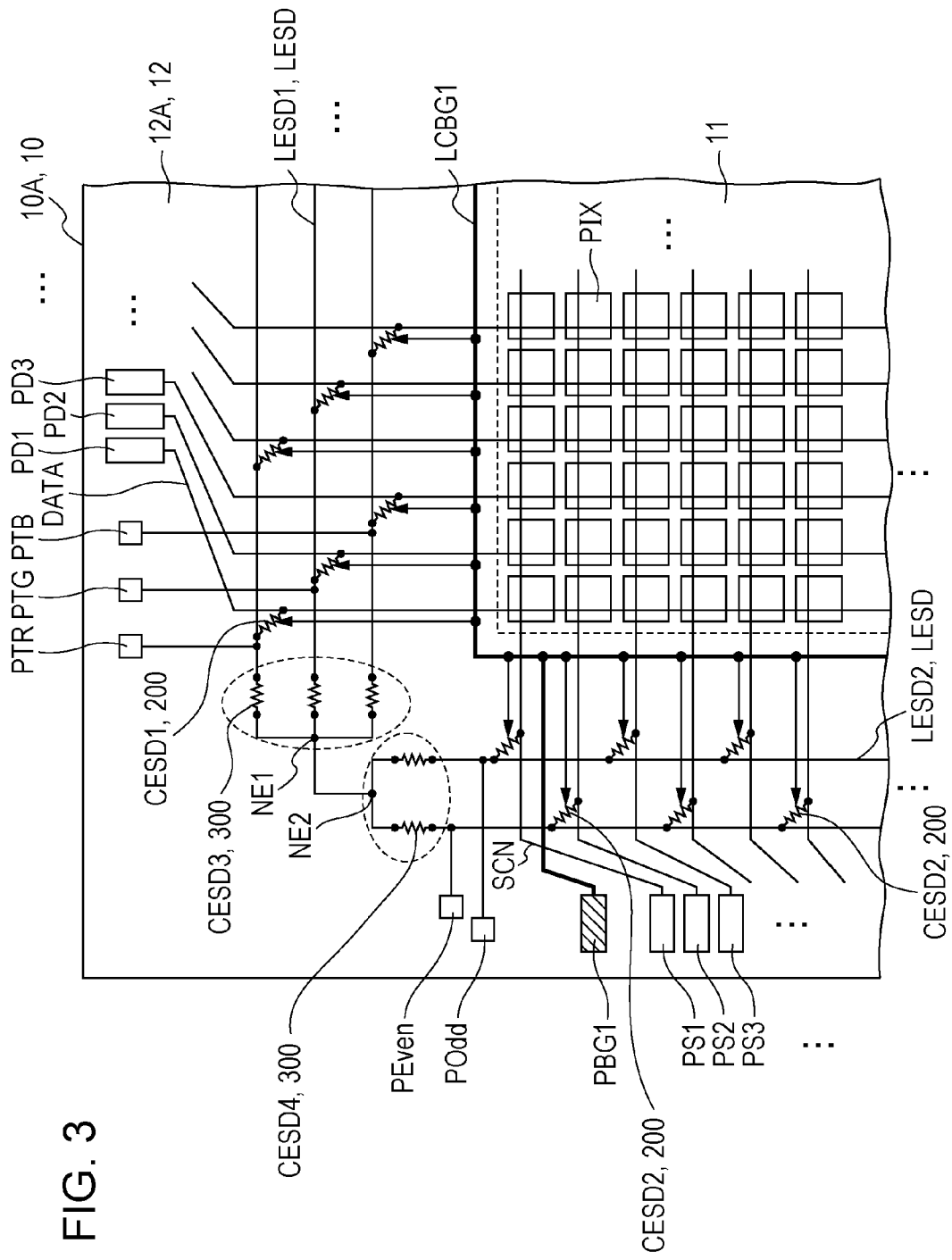
FIG. 3 is a partial enlarged view illustrating a portion of a panel for a display device according to the first embodiment.

The organic EL panel 10A according to the first embodiment is a panel for displaying video, and is one of the components that constitute the organic EL display 100. FIG. 2 is a diagram illustrating the entire organic EL panel 10A. FIG. 3 is an enlarged view illustrating the portion enclosed by a broken line in FIG. 2.

As illustrated in FIGS. 1 to 3, the organic EL panel 10A includes a display unit 11 and a circuit unit 12A (12).

1) Configuration of Display Unit 11

Figure 4:
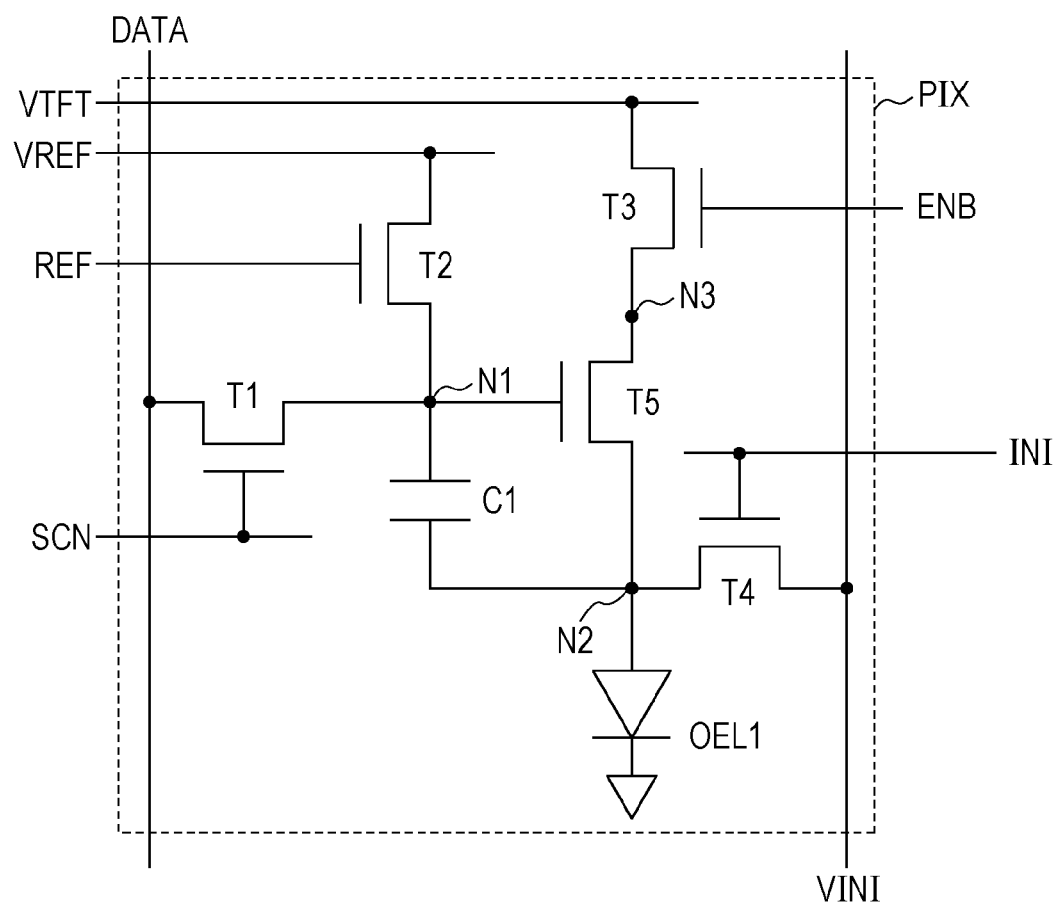
FIG. 4 is a circuit diagram illustrating an example of the configuration of a display pixel according to the first to fourth embodiments.

The display unit 11 includes a plurality of display pixels PIX arranged in a matrix. FIG. 4 is a circuit diagram illustrating an example of the configuration of one of the display pixels PIX. The display pixel PIX corresponds to any one of three primary colors: red (R), green (G), and blue (B). A set of three display pixels PIX of RGB constitutes one pixel.

As illustrated in FIG. 4, the pixel PIX includes switching elements T1 to T4, a capacitance element C1, a driving transistor T5, and an organic EL element (light-emitting element) OEL1.

The switching element T1 switches between selection and non-selection of the display pixel PIX in response to a drive signal output from the control unit 40. The switching element T1 is a thin film transistor (TFT). The gate terminal thereof is connected to a scanning line SCN. The source terminal thereof is connected to a signal line DATA. The drain terminal thereof is connected to a node N1.

The switching element T2 supplies a reference voltage (a voltage of a pad VREF) in accordance with a voltage of a control line REF. The switching element T2 is a TFT. The gate terminal thereof is connected to the control line REF. One of the source terminal and drain terminal thereof is connected to the node N1. The other of the source terminal and drain terminal thereof receives a reference voltage.

The switching element T3 supplies a drive voltage (a voltage of a pad VTFT) in accordance with a voltage of a control line ENB. The switching element T3 is a TFT. The gate terminal thereof is connected to the control line ENB. The source terminal thereof is connected to a node N3. The drain terminal thereof receives a drive voltage.

The switching element T4 discharges charges of the capacitance element C1 in accordance with a voltage of a control line INI. The switching element T4 is a TFT. The gate terminal thereof is connected to the control line INI. One of the source terminal and drain terminal thereof is connected to a node N2. The other of the source terminal and drain terminal thereof receives an initial voltage (a voltage of a pad VINI).

The driving transistor T5 supplies a drive current corresponding to a magnitude of a luminance signal to the organic EL element OEL1. The driving transistor T5 is a TFT. The gate terminal thereof is connected to the node N1. The source terminal thereof is connected to an anode electrode of the organic EL element OEL1. The drain terminal thereof is connected to the node N3.

The organic EL element OEL1 is a light-emitting element that emits light in accordance with a drive current. The drive current is supplied from the driving transistor T5. The anode electrode of the organic EL element OEL1 is connected to the node N2. The cathode electrode thereof is grounded.

A first terminal of the capacitance element C1 is connected to the node N1. A second terminal of the capacitance element C1 is connected to the node N2.

2) Configuration of Circuit Unit 12A

The circuit unit 12A includes wires and pads that are used for usual operation, and a test circuit or the like used for an emission test.

The wires used for usual operation include, as illustrated in FIG. 3, a plurality of scanning lines SCN and a plurality of signal lines DATA. Also the wires used for usual operation include a plurality of control lines REF, ENB, INI, and so forth.

The pads used for usual operation include, as illustrated in FIG. 3, pads PD1 to PDn (n represents the number of signal lines DATA) connected to the signal lines DATA, pads PS1 to PSm (m represents the number of scanning lines SCN) connected to the scanning lines SCN, and so forth.

As illustrated in FIG. 3, the test circuit includes pads for an emission test (hereinafter referred to as "test pads"), ESD elements 200 for an emission test, and ESD elements 300 for connecting a plurality of ESD wires LESD (LESD1 and LESD2). The ESD wires correspond to an example of electrostatic protection wires for discharging static electricity.

The test pads are pads used for a test that is performed in manufacturing, including an emission test, and may be dedicated pads or pads that are also used for usual operation. In the first embodiment, a description will be given of a case where dedicated test pads for an emission test are provided.

The test pads include a test pad PTR connected to the individual signal lines of the display pixels PIX of R (red) via an electrostatic protection circuit, a test pad PTG connected to the individual signal lines of the display pixels PIX of G (green) via an electrostatic protection circuit, and a test pad PTB connected to the individual signal lines of the display pixels PIX of B (blue) via an electrostatic protection circuit. Also, the test pads include a test pad POdd connected to individual odd-numbered scanning lines SCN via an electrostatic protection circuit, a test pad PEven connected to individual even-numbered scanning lines SCN via an electrostatic protection circuit, and a test pad PBG1 connected to a back-gate terminal of an ESD element for an emission test. The test pad PBG1 is an example of a back-gate pad.

Each of the ESD elements 200 is an ESD element including a back-gate-type transistor, and is an example of an electrostatic protection circuit for protecting the display pixels PIX from electrostatic discharge.

The ESD elements 200 include ESD elements CESD1 and ESD elements CESD2. The ESD elements CESD1 each have a first terminal connected to a signal line DATA and a second terminal connected to any one of the test pads PTR, PTG, and PTB. The ESD elements CESD2 each have a first terminal connected to a scanning line SCN and a second terminal connected to any one of the test pads PEven and POdd.

More specifically, the ESD elements 200 each include two back-gate-type transistors in which a gate electrode and a drain electrode are short-circuited.

Figure 5A:
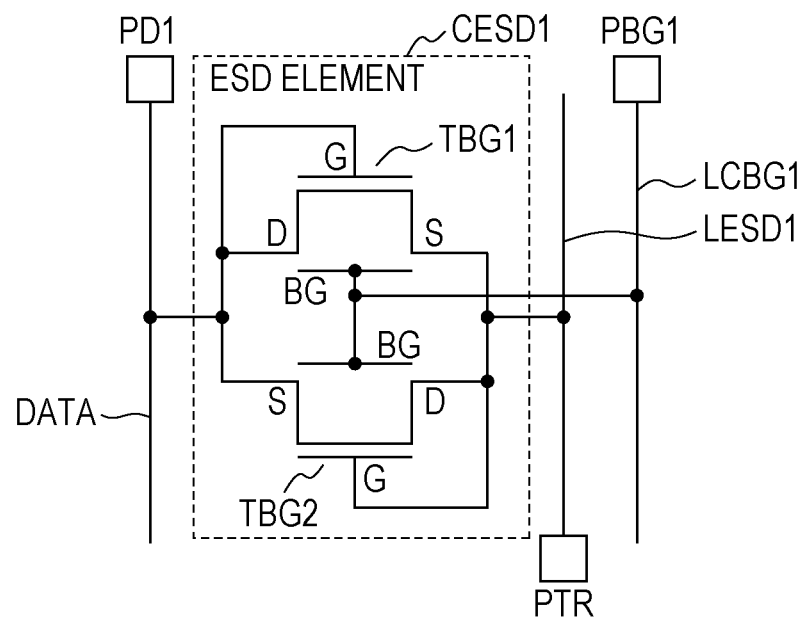
FIG. 5A is a circuit diagram illustrating an example of an electrostatic protection circuit including back-gate-type transistors according to the first to fourth embodiments.
Figure 5B:
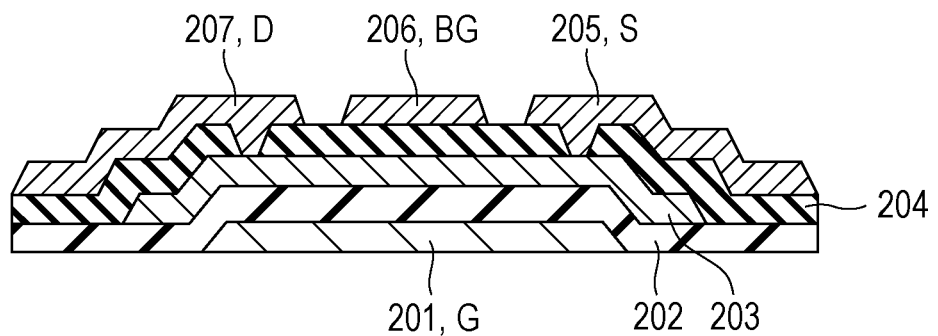
FIG. 5B is a cross-sectional view illustrating the structure of a back-gate-type transistor illustrated in FIG. 5A.

FIG. 5A is a circuit diagram illustrating an example of an electrostatic protection circuit (ESD element 200) including back-gate-type transistors. FIG. 5B is a cross-sectional view illustrating the structure of the back-gate-type transistor TBG1 illustrated in FIG. 5A. For the convenience of description, FIG. 5A illustrates the ESD element CESD1 connected to the signal line DATA connected to the display pixel PIX in the first row and first column (upper left in the figure). The configuration of the ESD element CESD2 is the same as the configuration of the ESD element CESD1 except that a connection destination is different.

As illustrated in FIG. 5A, the ESD element CESD1 includes two back-gate-type transistors TBG1 and TBG2.

As illustrated in FIG. 5A, the gate terminal G and drain terminal D of the back-gate-type transistor TBG1 are connected to the signal line DATA. The source terminal S thereof is connected to the ESD wire LESD1. The back-gate terminal BG thereof is connected to a control line LCBG1. The control line LCBG1 is an example of an electrostatic protection circuit control line. The gate terminal G and drain terminal D of the back-gate-type transistor TBG2 are connected to the ESD wire LESD1. The source terminal S thereof is connected to the signal line DATA. The back-gate terminal BG thereof is connected to the control line LCBG1.

As illustrated in FIG. 5B, the back-gate-type transistor TBG1 includes a gate electrode 201 (the gate terminal G in FIG. 5A), a gate insulating layer 202, a semiconductor layer 203 (semiconductor layer), an insulating layer 204, a source electrode 205 (the source terminal S in FIG. 5A), a back-gate electrode 206 (the back-gate terminal BG in FIG. 5A), and a drain electrode 207 (the drain terminal D in FIG. 5A).

More specifically, the gate electrode 201 is disposed on a substrate (not illustrated), and the gate insulating layer 202 is disposed so as to cover the gate electrode 201. On the gate insulating layer 202, the semiconductor layer 203 is disposed at a position facing the gate electrode 201. The insulating layer 204 is disposed on the semiconductor layer 203. The source electrode 205 and the drain electrode 207 are disposed on the insulating layer 204. The source electrode 205 and the drain electrode 207 are electrically connected to the semiconductor layer 203 via contact holes provided in the insulating layer 204. Further, the back-gate electrode 206 is disposed between the source electrode 205 and the drain electrode 207, on the insulating layer 204.

The configuration of the back-gate-type transistor TBG2 is the same as the configuration of the back-gate-type transistor TBG1.

In the first embodiment, a gate terminal and a drain terminal of a transistor serving as an ESD element are short-circuited (diode-connected), so that a current flows in one direction from the drain electrode side toward the source electrode side in accordance with a source-drain voltage difference. That is, the transistor functions as a so-called diode, not as a switching element.

Further, two diode-connected transistors are connected in parallel to each other so that the direction of so-called forward bias is a reverse direction. Accordingly, a current can flow (escape) not only from the signal line DATA side toward the ESD wire LESD side, but also from the ESD wire LESD side toward the signal line DATA side. Also, the resistance value of a so-called diode can be adjusted by using back-gate-type transistors and enabling the voltages of back-gate terminals to be adjustable, as described above.

Each of the ESD elements 300 is an ESD element including transistors that do not have a back-gate terminal, and is used to connect a plurality of ESD wires LESD in the first embodiment. As a result of connecting the plurality of ESD wires LESD, the capacitance of wires for allowing surge to escape can be relatively increased. However, if the plurality of ESD wires LESD are directly connected to one another, short-circuit is likely to occur during an emission test. Thus, the ESD elements 300 that function as resistors are provided between the ESD wires LESD.

The ESD elements 300 include ESD elements CESD3 (second resistance circuits). The ESD elements CESD3 each include a first terminal connected to an ESD wire LESD1 and a second terminal connected to a node NE1. Further, the ESD elements 300 include ESD elements CESD4 (second resistance circuits). The ESD elements CESD4 each include a first terminal connected to an ESD wire LESD2 and a second terminal connected to a node NE2. The node NE1 and the node NE2 are directly connected to each other.

In the first embodiment, the ESD elements 300 each include two transistors in which a gate electrode and a drain electrode are short-circuited and which do not include a back-gate terminal.

Figure 6A:
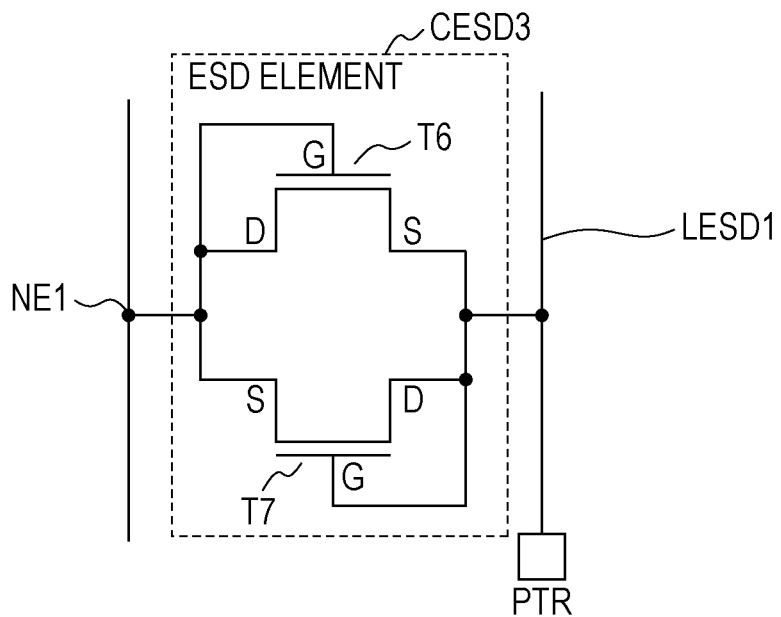
FIG. 6A is a circuit diagram illustrating an example of an electrostatic protection circuit including transistors that do not have a back-gate terminal.
Figure 6B:
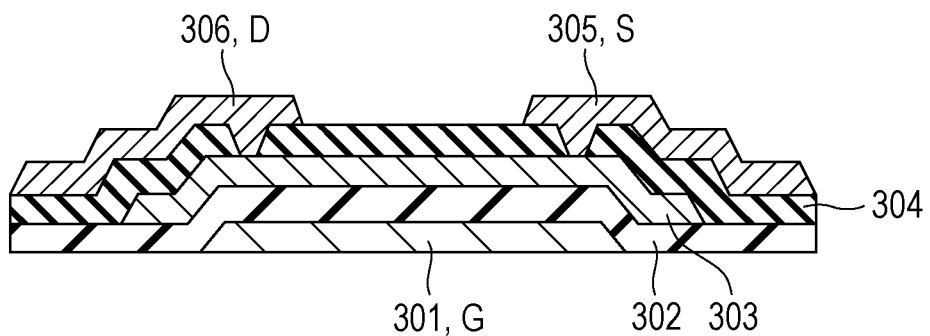
FIG. 6B is a cross-sectional view illustrating the structure of a transistor illustrated in FIG. 6A.

FIG. 6A is a circuit diagram illustrating an example of the ESD element 300. FIG. 6B is a cross-sectional view illustrating the structure of a transistor T6 that does not include a back-gate terminal, illustrated in FIG. 6A. For the convenience of description, FIG. 6A illustrates the ESD element CESD3 connected to the test pad PTR. The configuration of the ESD element CESD4 is the same as the configuration of the ESD element CESD3 except that a connection destination is different.

As illustrated in FIG. 6A, the ESD element CESD3 includes two transistors T6 and T7 that do not include a back-gate terminal.

As illustrated in FIG. 6A, the gate terminal G and drain terminal D of the transistor T6 are connected to the node NE1. The source terminal S thereof is connected to the ESD wire LESD1. The gate terminal G and drain terminal D of the transistor T7 are connected to the ESD wire LESD1. The source terminal S thereof is connected to the node NE1.

As illustrated in FIG. 6B, the transistor T6 includes a gate electrode 301 (the gate terminal G in FIG. 6A), a gate insulating layer 302, a semiconductor layer 303, an insulating layer 304, a source electrode 305 (the source terminal S in FIG. 6A), and a drain electrode 306 (the drain terminal D in FIG. 6A).

More specifically, the gate electrode 301 is disposed on a substrate (not illustrated), and the gate insulating layer 302 is disposed so as to cover the gate electrode 301. On the gate insulating layer 302, the semiconductor layer 303 is disposed at a position facing the gate electrode 301. The insulating layer 304 is disposed on the semiconductor layer 303. The source electrode 305 and the drain electrode 306 are disposed on the insulating layer 304. The source electrode 305 and the drain electrode 306 are electrically connected to the semiconductor layer 303 via contact holes provided in the insulating layer 304.

The configuration of the transistor T7 is the same as the configuration of the transistor T6.

1-1-2. Configuration of COF Circuit, PCB, Control Circuit, and Power Supply Circuit The COF circuits 20 are each constituted by a flexible cable including a drive circuit for supplying various signals to the display unit 11, and are connected to pads of the organic EL panel 10A. As illustrated in FIG. 1, the COF circuits 20 include COF circuits 21 connected to the signal lines DATA and COF circuits 22 connected to the scanning lines SCN. The COF circuits 21 each include a signal line drive circuit for supplying a voltage corresponding to a luminance signal to the signal lines DATA. The COF circuits 22 each include a scanning line drive circuit for supplying a drive signal to the scanning lines SCN connected to selected display pixels PIX.

The PCB 30 is a printed circuit board for connecting the COF circuits 20 and the control unit 40 to each other. In FIG. 1, the control unit 40 is not connected to all the COF circuits 20 for the convenience of illustration, but actually the control unit 40 is connected to all the COF circuits 20.

The control unit 40 is a circuit for controlling display of video on the organic EL panel 10A. For example, the control unit 40 generates a luminance signal and applies it to a signal line DATA. Also, the control unit 40 generates a drive signal for switching between selection and non-selection of a display pixel PIX and applies it to a scanning line SCN.

The power supply circuit (not illustrated) is a circuit for supplying, to the control unit 40, power that is to be used in each circuit constituting the organic EL display 100. For example, the power supply circuit supplies a drive voltage for the pad VTFT, a reference voltage for the pad VREF, and an initial voltage for the pad VINI illustrated in FIG. 4.

1-2. Method for Testing Organic EL Panel

Figure 7:
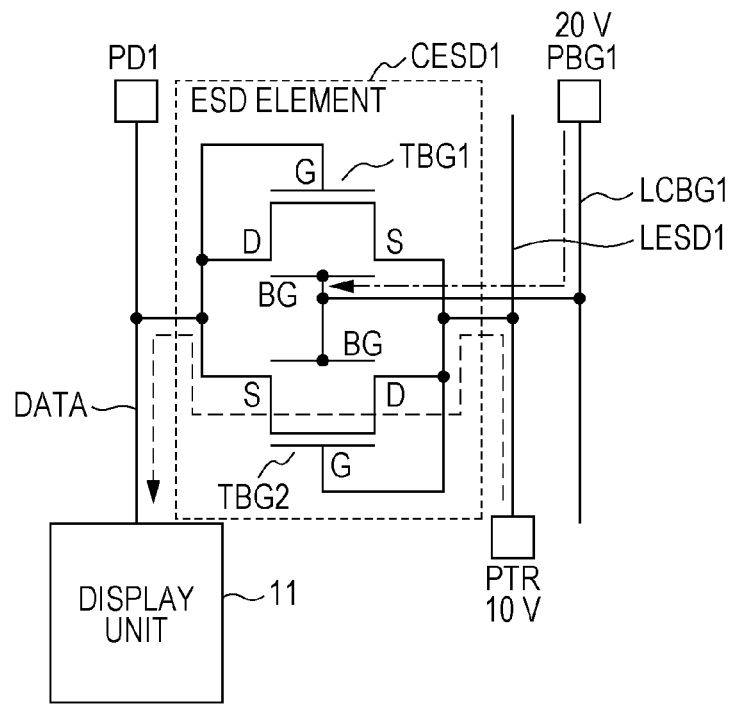
FIG. 7 is a diagram illustrating a method for setting a voltage during an emission test.

A method for testing an organic EL panel (a method for setting a voltage of the organic EL panel 10 during an emission test) will be described with reference to FIG. 7. FIG. 7 is a diagram illustrating a method for setting a voltage during an emission test.

An emission test of an organic EL panel is one of steps of a process of manufacturing the organic EL display 100, and is performed after a cutting step for obtaining the organic EL panel and before an IC mounting step of mounting the COF circuits 20.

In the following description, "test signals" are various signals that are input during an emission test. Specific examples of the test signals include luminance signals for an emission test (hereinafter referred to as "test luminance signals" as appropriate), scanning signals (drive signals) for an emission test (hereinafter referred to as "test drive signals" as appropriate), and control signals for an emission test. "Wires" include signal lines, scanning lines, and control lines (control line INI, control line REF, and control line ENB (see FIG. 2)).

In an emission test, the following steps are performed: a step of applying a back-gate voltage for an emission test to the back-gate terminals of the back-gate-type transistors TBG1 and TBG2; and a step of applying a test luminance signal to the signal lines DATA and applying a test drive signal to the scanning lines SCN at the same time.

In the step of applying a back-gate voltage for an emission test, the voltage of the control line LCBG1 is adjusted so that the resistance values of the ESD elements CESD1 and CESD2 become low, that is, so that the source-drain threshold voltage of the back-gate-type transistors TBG1 and TBG2 becomes low. In other words, a certain voltage higher than the voltages of the signal lines DATA and the scanning lines SCN is applied to the control line LCBG1.

In the step of applying a test luminance signal, a voltage (test luminance signal) is applied to the signal lines DATA, not from the pads PD1 to PDn directly connected thereto, but from the test pad PTR connected to the individual pads via the ESD elements CESD1. Accordingly, the number of pads to which a voltage is applied during a test can be reduced. In the state of a product on which an IC (for example, COF circuit) is mounted, ESD measures have been taken in the IC. However, an IC has not been mounted at the time of an emission test, and thus ESD measures are taken in the above-described manner. That is, as a result of providing the ESD elements CESD1, breakdown of the circuits in the display unit 11 can be prevented even if a current flows through the test pad PTR or the pads PD1 to PDn that are directly connected to the signal lines DATA due to electrostatic discharge.

Also, the number of pads on a drive signal side can be reduced by inputting a test drive signal via the ESD elements CESD2. At the same time, breakdown of the circuits in the display unit 11 can be prevented even if a current flows through the test pads PEven and POdd and the pads PS1 to PSm that are directly connected to the scanning lines SCN due to electrostatic discharge.

The voltage value of the test pad PBG1 may be set so that the resistance values of the ESD elements CESD1 become lower than a certain low resistance value. In other words, the resistance values of the ESD elements CESD1 depend on the difference between the voltage value of the test pad PBG1 and the voltage value of the signal lines DATA, and are thus set so that the difference becomes larger than a certain value.

That is, a certain voltage higher than a voltage applied to the test pad PTR is applied to the test pad PBG1 connected to the control line LCBG1.

More specifically, for example, as illustrated in FIG. 7, 10 V is applied to the test pad PTR, that is, to the signal line DATA, and 20 V, which is higher than the voltage applied to the test pad PTR, is applied to the test pad PBG1. FIG. 7 illustrates the display pixel PIX in the first row and first column. For the other display pixels PIX, voltages are set in the same manner. Note that the voltage value of the signal lines DATA and the voltage value of the test pad PBG1 are examples, and are not limited thereto.

In this case, a voltage of 20 V which is higher than the voltage of the signal lines DATA is applied to the back-gate terminals of the back-gate-type transistors TBG1 and TBG2, and accordingly the resistance values of the ESD elements CESD1 become small. Thus, the test luminance signal input to the test pad PTR is transmitted to the signal lines DATA without being attenuated so much. Accordingly, an emission test can be normally performed.

FIG. 7 illustrates the display pixel PIX in the first row and first column. For the other display pixels PIX, voltages are set in the same manner.

In an emission test, the voltage value of a test luminance signal is sequentially changed so as to correspond to a plurality of luminance values. Thus, the voltage to be applied to the test pad PBG1 is set to a voltage value larger than the maximum voltage value of the test luminance signal.

The voltage to be applied to the test pad PBG1 may be changed as appropriate in accordance with the voltage value of the test luminance signal.

1-3. Method for Setting Voltage During Usual Operation of ESD Element (Electrostatic Protection Circuit)

Figure 8:
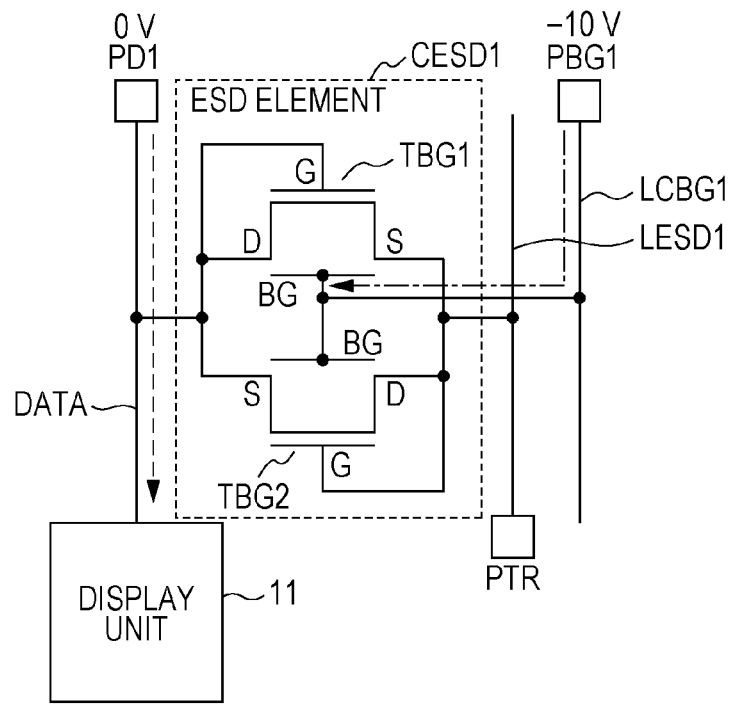
FIG. 8 is a diagram illustrating a method for setting a voltage during usual operation.

A method for setting a voltage of the organic EL panel 10 during usual operation will be described with reference to FIG. 8. FIG. 8 is a diagram illustrating a method for setting a voltage during usual operation.

During usual operation, the voltage of the control line LCBG1 is adjusted so that the resistance values of the ESD elements CESD1 and CESD2 become large, that is, so that the threshold voltages of the back-gate-type transistors TBG1 and TBG2 become high. In other words, a certain voltage lower than the voltages of the signal line DATA and the scanning line SCN is applied to the control line LCBG1.

That is, a certain voltage lower than the voltage applied to the pad PD1 connected to the signal line DATA is applied to the test pad PBG1 connected to the control line LCBG1.

More specifically, for example, as illustrated in FIG. 8, 0 V is applied to the pad PD1, that is, to the signal line DATA, and a voltage lower than the voltage applied to the pad PD1 (for example, −10 V) is applied to the test pad PBG1. Note that the method for setting the voltages to be applied to the test pad PBG1 and the pad PD1 is not limited thereto.

FIG. 8 illustrates the display pixel PIX in the first row and first column. For the other display pixels PIX, voltages are set in the same manner.

In this case, a certain voltage lower than the voltage of the signal lines DATA is applied to the back-gate terminals of the back-gate-type transistors TBG1 and TBG2, and accordingly the resistance values of the ESD elements CESD1 and CESD2 become large. Thus, a leak current that flows through the ESD elements CESD1 and CESD2 can be reduced as illustrated in FIG. 8. Accordingly, an increase in power consumption during usual operation can be suppressed, and degradation of the characteristics of the display unit 11 can be prevented.

1-4. Advantages

As described above, in the organic EL panel 10A (a panel for a display device) according to the first embodiment, a voltage for an emission test is applied to the display unit 11 via ESD elements (electrostatic protection circuits) including back-gate-type transistors.

Figure 9:
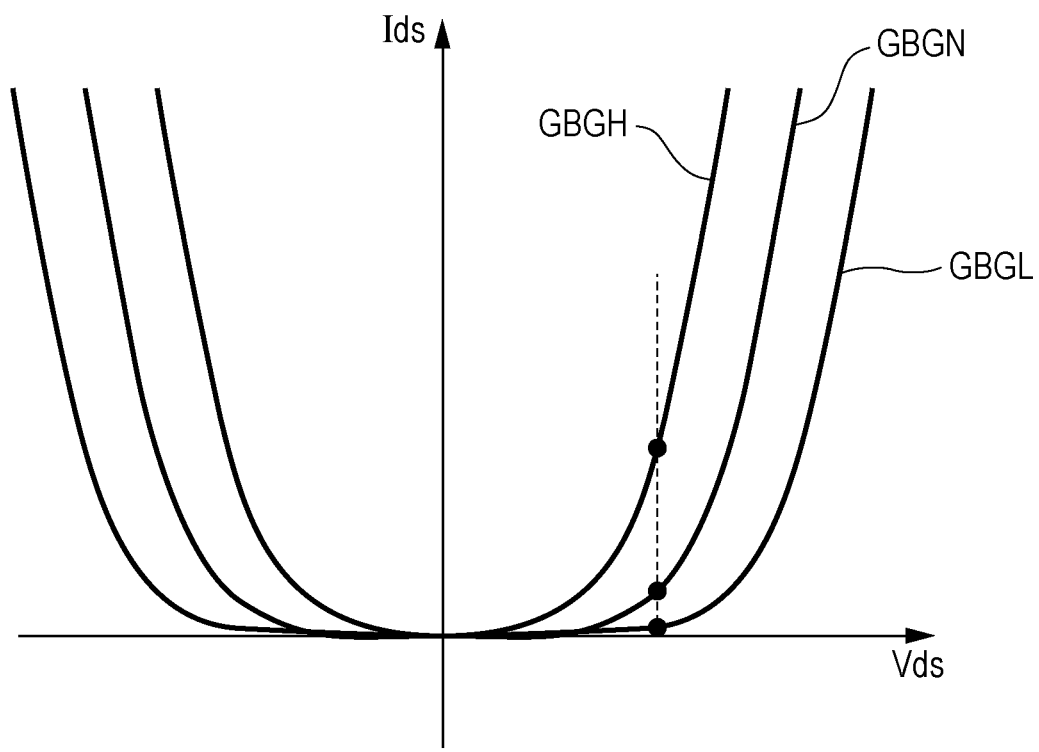
FIG. 9 is a graph illustrating IV characteristics of a transistor.

FIG. 9 is a graph illustrating IV characteristics of a transistor (the relationships between a source-drain voltage and a source-drain current). In FIG. 9, GBGH represents an IV characteristic in a case where a high voltage is applied to a back-gate terminal of a back-gate-type transistor. GBGL represents an IV characteristic in a case where a low voltage is applied to the back-gate terminal of the back-gate-type transistor. GBGN represents an IV characteristic of a transistor that does not include a back-gate terminal.

It can be understood from FIG. 9 that the resistance decreases and the amount of current increases in a case where a high voltage is applied to the back-gate terminal, and that the resistance increases and the amount of current decreases in a case where a low voltage is applied to the back-gate terminal.

In the first embodiment, with use of such IV characteristics of the back-gate-type transistor, the resistance of the ESD elements CESD1 and CESD2 during an emission test are different from those during usual operation.

Accordingly, during an emission test, the resistance of the ESD elements can be decreased and a signal for an emission test can be normally input only by adjusting the voltage of the back-gate terminal. During usual operation, an increase in leak current can be suppressed by increasing the resistance of the ESD elements. In this way, two advantages can be obtained at the same time.

Further, because an emission test is performed after a cutting step for obtaining the organic EL panel 10A, defects generated by the cutting step can be detected through screening.

Second Embodiment

A panel for a display device, a display device including the panel, and a method for testing the panel according to a second embodiment will be described with reference to FIG. 10.

The display device according to the second embodiment is different from the display device according to the first embodiment in the configuration of the panel (organic EL panel). The method for testing the panel according to the second embodiment is the same as the method according to the first embodiment.

The display device according to the second embodiment is the organic EL display 100, as in the first embodiment. The organic EL display 100 includes an organic EL panel 10B (10), the COF circuits 20, the PCB 30, the control unit 40, and the power supply circuit (not illustrated). The configurations of the COF circuits 20, the PCB 30, the control unit 40, and the power supply circuit are the same as those in the first embodiment.

2-1. Configuration of Organic EL Panel (Panel for Display Device)

The organic EL panel 10B according to the second embodiment is a panel that displays video, and is one of the components that constitute the organic EL display 100, as in the first embodiment. FIG. 10 is an enlarged view illustrating the portion enclosed by the broken line in FIG. 2.

Figure 10:
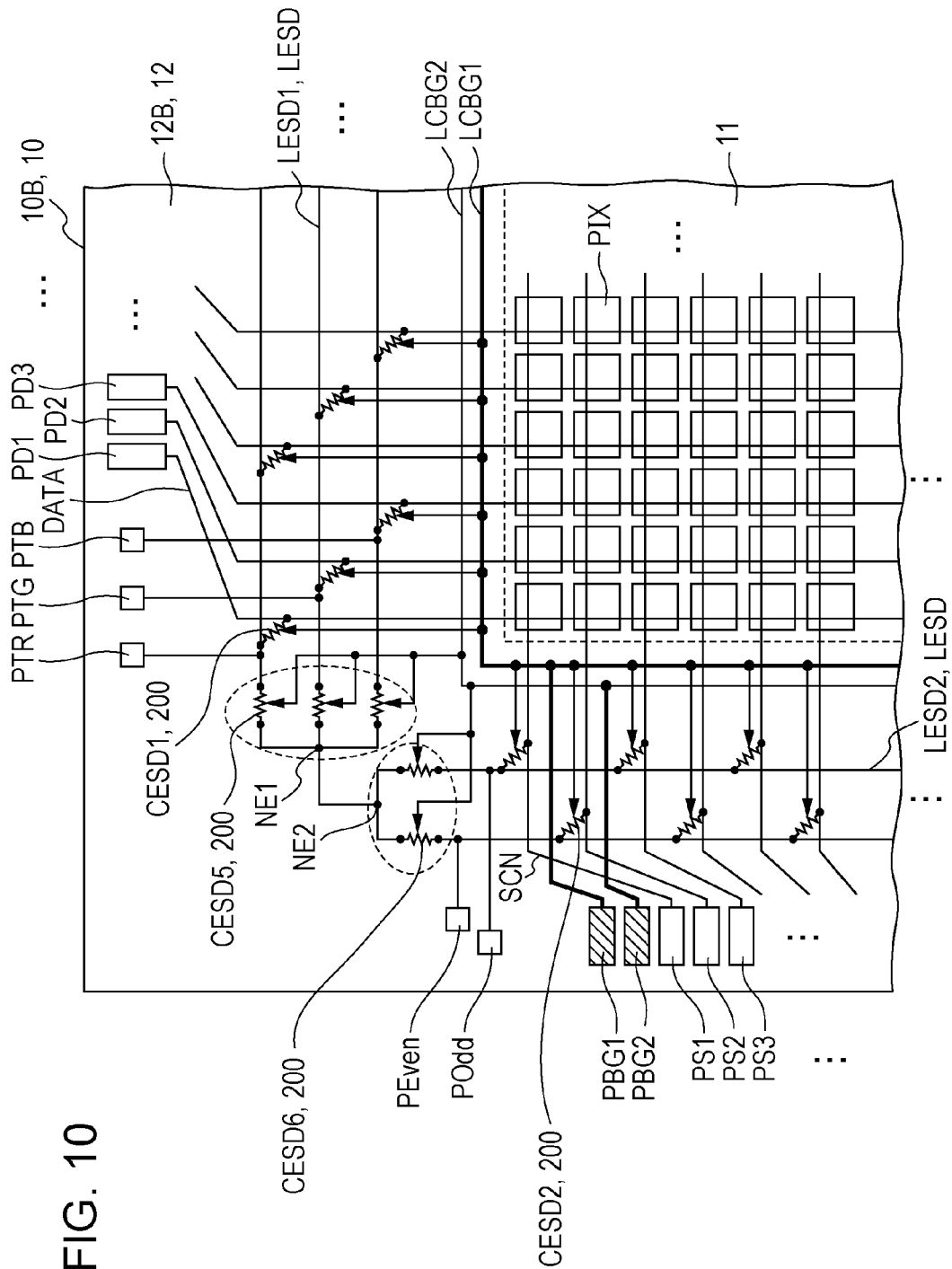
FIG. 10 is a partial enlarged view illustrating a portion of the panel for a display device according to the second embodiment.

As illustrated in FIG. 10, the organic EL panel 10B includes the display unit 11 and a circuit unit 12B (12). The configuration of the display unit 11 is the same as that in the first embodiment.

The circuit unit 12B includes wires and pads that are used for usual operation, and a test circuit used for an emission test. The configurations of the wires and pads used for usual operation are the same as those in the first embodiment.

As illustrated in FIG. 10, the test circuit includes the test pads, the ESD elements CESD1 and CESD2 for an emission test, and ESD elements CESD5 and CESD6 (second resistance circuits) for connecting the plurality of ESD wires LESD (LESD1 and LESD2). The configurations of the test pads and the ESD elements CESD1 and CESD2 are the same as those in the first embodiment.

In the first embodiment, the ESD elements CESD3 and CESD4 that do not include a back-gate terminal are used to connect the plurality of ESD wires LESD. In contrast, in the second embodiment, the ESD elements CESD5 and CESD6 are used.

The ESD elements CESD5 each include a first terminal connected to an ESD wire LESD1 and a second terminal connected to the node NE1. The ESD elements CESD6 each include a first terminal connected to an ESD wire LESD2 and a second terminal connected to the node NE2. The configurations of the ESD elements CESD5 and CESD6 are the same as the configuration of the ESD elements CESD1 illustrated in FIGS. 5A and 5B of the first embodiment.

The back-gate terminals of the back-gate-type transistors TBG1 and TBG2 included in the ESD elements CESD5 and CESD6 are connected to a control line LCBG2. The control line LCBG2 is an example of an electrostatic protection circuit control line, and is connected to a test pad PBG2. The test pad PBG2 is an example of a back-gate pad.

During an emission test, a low voltage is applied to the test pad PBG2 to increase the resistance, and accordingly the plurality of ESD wires LESD can be separated. During usual operation, a high voltage is applied to the test pad PBG2 to decrease the resistance, and accordingly the relative capacitance of the ESD wires LESD can be increased.

2-2. Advantages

In the organic EL panel 10B according to the second embodiment, the ESD elements CESD5 and CESD6 including back-gate-type transistors are used as the ESD elements that connect the plurality of ESD wires LESD. Accordingly, during an emission test, a low voltage is applied to the test pad PBG2 to increase the resistance, the plurality of ESD wires LESD can be separated, and a test luminance signal can be normally input to the display unit 11 more appropriately. During usual operation, a high voltage is applied to the test pad PBG2 to decrease the resistance, and the relative capacitance of the ESD wires LESD can be increased.

In the organic EL panel 10B according to the second embodiment, as in the first embodiment, a voltage for an emission test is applied to the display unit 11 via ESD elements (electrostatic protection circuits) including back-gate-type transistors. Accordingly, during an emission test, the resistance of the ESD elements can be decreased and a signal for an emission test can be normally input only by adjusting the voltage of the back-gate terminals, as in the first embodiment. During usual operation, the resistance of the ESD elements can be increased to suppress an increase in leak current. In this way, two advantages can be obtained at the same time.

Third Embodiment

A panel for a display device, a display device including the panel, and a method for testing the panel according to a third embodiment will be described with reference to FIGS. 11 to 13.

The display device according to the third embodiment is different from the display device according to the first embodiment in the configuration of the panel (organic EL panel). The method for testing the panel according to the third embodiment is the same as the method according to the first embodiment.

The display device according to the third embodiment is the organic EL display 100, as in the first embodiment. The organic EL display 100 includes an organic EL panel 10C (10), the COF circuits 20, the PCB 30, the control unit 40, and the power supply circuit (not illustrated). The configurations of the COF circuits 20, the PCB 30, the control unit 40, and the power supply circuit are the same as those in the first embodiment.

3-1. Configuration of Organic EL Panel (Panel for Display Device)

The organic EL panel 10C according to the third embodiment is a panel that displays video, and is one of the components that constitute the organic EL display 100, as in the first embodiment. FIG. 11 is an enlarged view illustrating the portion enclosed by the broken line in FIG. 2.

Figure 11:
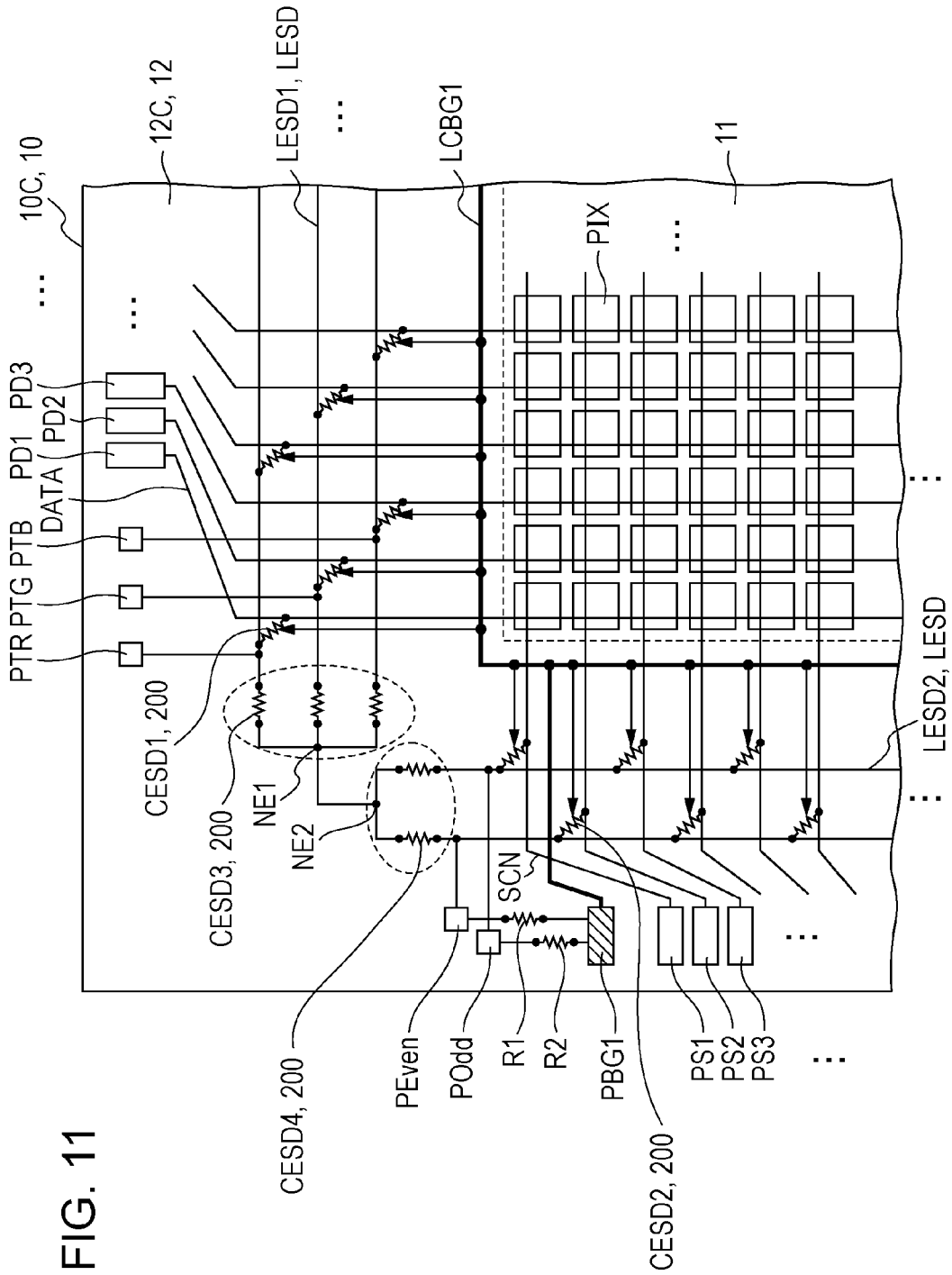
FIG. 11 is a partial enlarged view illustrating a portion of the panel for a display device according to the third embodiment.

As illustrated in FIG. 11, the organic EL panel 10C includes the display unit 11 and a circuit unit 12C (12). The configuration of the display unit 11 is the same as that in the first embodiment.

The circuit unit 12C includes wires and pads that are used for usual operation, and a test circuit used for an emission test. The configurations of the wires and pads used for usual operation are the same as those in the first embodiment.

As illustrated in FIG. 11, the test circuit includes the test pads, the ESD elements CESD1 and CESD2 for an emission test, and the ESD elements CESD3 and CESD4 for connecting the plurality of ESD wires LESD (LESD1 and LESD2). The configurations of the test pads and the ESD elements CESD1 to CESD4 are the same as those in the first embodiment.

The test circuit according to the third embodiment further includes a resistor R1 and a resistor R2 (first resistance circuits).

The resistor R1 is disposed between the test pad PEven and the test pad PBG1. The resistor R2 is disposed between the test pad POdd and the test pad PBG1. For the resistors R1 and R2, an ESD element that does not include a back-gate terminal may be used, or a usual resistance element may be used. The resistance values of the resistors R1 and R2 may be equal to, for example, the resistance value of the ESD element CESD1 during usual operation. Further, the resistance values of the resistors R1 and R2 may be identical to or different from each other.

The resistors R1 and R2 are provided to reduce troubles caused by a surge voltage when the organic EL panel 10 is being transported or the display device is being manufactured.

Hereinafter, a description will be given of a state of a circuit in the following two cases with reference to FIGS. 12 and 13: (1) a case where a surge voltage of a high voltage value is input, and (2) a case where a surge voltage of a low voltage value is input.

Figure 12:
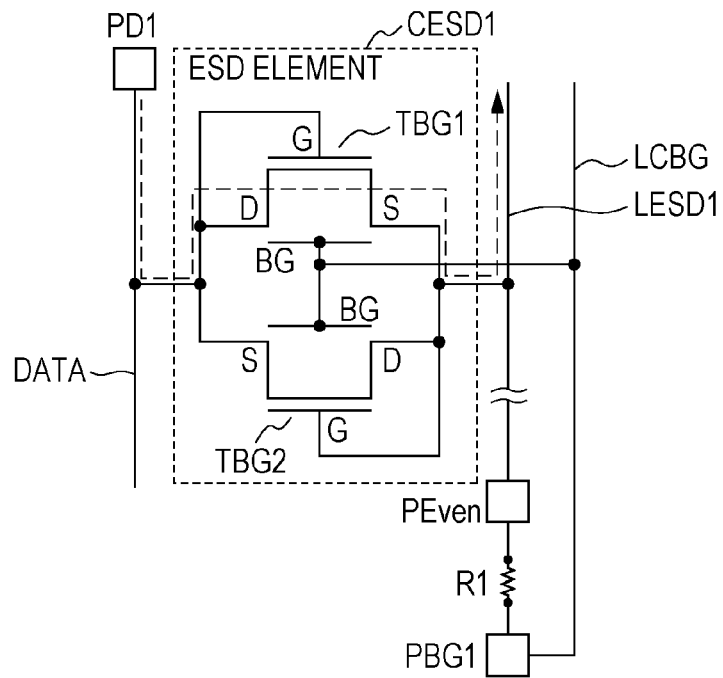
FIG. 12 is a diagram illustrating an example of a state in which a surge voltage is generated in an electrostatic protection circuit according to the third embodiment.

FIG. 12 is a circuit diagram illustrating a state of the ESD element CESD1 in a case where a surge voltage of a high voltage value is input from the pad PD1. FIG. 13 is a circuit diagram illustrating a state of the ESD element CESD1 in a case where a surge voltage of a low voltage value is input from the pad PD1.

(1) Referring to FIG. 12, in case where a surge voltage of a high voltage value is input from the pad PD1, a current escapes from the pad PD1 to the ESD wire LESD1 via the back-gate-type transistor TBG1. In the third embodiment, the test pad PEven and the test pad PBG1 are short-circuited by the resistor R1 and are at the same potential, and thus the back-gate-source voltage Vbs is 0 V. Thus, the resistance of the ESD element CESD1 is low (a resistance substantially equivalent to the resistance of the transistor that does not include a back-gate electrode, see the IV characteristic GBGN illustrated in FIG. 9), and input of a current to the display unit 11 side can be prevented.

Figure 13:
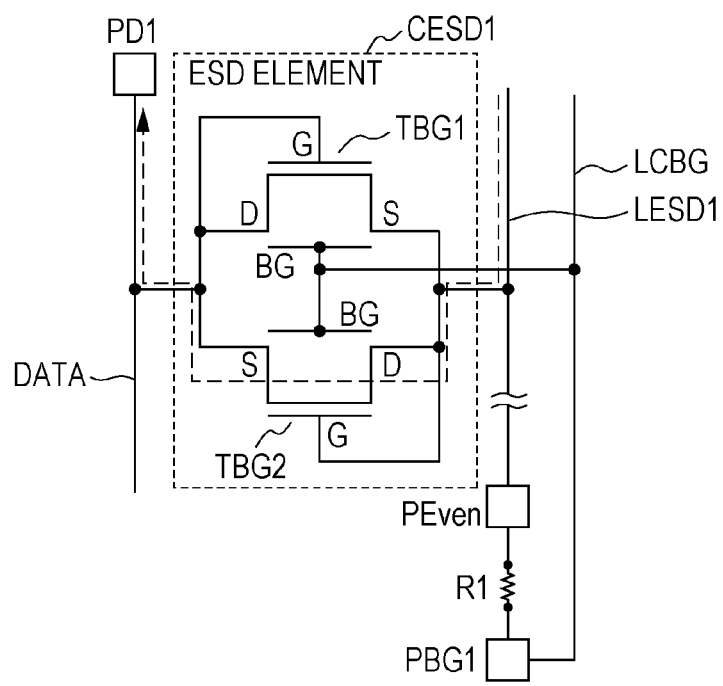
FIG. 13 is a diagram illustrating an example of a state in which a surge voltage is generated in the electrostatic protection circuit according to the third embodiment.

(2) Referring to FIG. 13, in case where a surge voltage of a low voltage value is input from the pad PD1, a current flows out from the ESD wire LESD1 to the pad PD1 side via the back-gate-type transistor TBG2. In the third embodiment, as described above, the back-gate-source voltage Vbs is 0 V due to the resistor R1, and the ESD element CESD1 has a resistance substantially equivalent to the resistance of the transistor that does not include a back-gate electrode and has the IV characteristic GBGN illustrated in FIG. 9, and input of a current to the display unit 11 side can be effectively prevented. If negative charges are stored in the test pad PBG1 without the resistor R1, the back-gate-source voltage Vbs is held in the state of Vbs<0, and the resistance of the ESD element CESD1 increases as indicated by GBGL illustrated in FIG. 9. Accordingly, it becomes impossible to allow a surge voltage input to the pad PD1 to adequately escape to the ESD wire LESD1. The resistor R1 is a bypass resistor that is provided between the back-gate and the source to prevent the above-described inconvenience.

The test pad PEven and the test pad PBG1 are short-circuited by the resistor R1. Thus, during an emission test, current leak from one of the test pads to the other test pad may occur, and a signal input to a pad may be attenuated. However, the resistance value of the resistor R1 is sufficiently large, and a signal is directly input to the test pad from an external power supply, and thus the emission test is not affected. Specifically, in a case where the resistance value of the resistor R1 is 1 kΩ, and the voltage between pads, which is the difference between the voltage value of the test pad PEven and the voltage value of the test pad PBG1, is 20 V, the leak current is 20 mA. Thus, with use of an external power supply having a driving capacity of larger than 20 mA, an emission test can be normally performed.

3-2. Advantages

The organic EL panel 10C (a panel for a display device) according to the third embodiment includes the resistors R1 and R2 for taking measures against a surge voltage that may be generated during transportation or manufacturing of the display device. Accordingly, even if a surge voltage is input from the outside during transportation or manufacturing of the display device, the back-gate-source voltage Vbs is 0 V, and thus an increase in resistance of the ESD elements CESD1 and CESD2 can be prevented.

Further, in the organic EL panel 10C according to the third embodiment, a voltage for an emission test is applied to the display unit 11 via the ESD elements (electrostatic protection circuits) including back-gate-type transistors, as in the first and second embodiments. Accordingly, during an emission test, the resistance of the ESD elements can be decreased and a signal for an emission test can be normally input only by adjusting the voltage of the tack-gate terminals, as in the first embodiment. Also, during usual operation, the resistance of the ESD elements can be increased to suppress an increase in leak current. In this way, two advantages can be obtained at the same time.

Fourth Embodiment

A panel for a display device, a display device including the panel, and a method for testing the panel according to a fourth embodiment will be described with reference to FIGS. 14 and 15.

The display device according to the fourth embodiment is different from the display device according to the first embodiment in the configuration of the panel (organic EL panel). The method for testing the panel according to the fourth embodiment is the same as the method according to the first embodiment.

The display device according to the fourth embodiment is the organic EL display 100, as in the first embodiment. The organic EL display 100 includes an organic EL panel 10D (10), the COF circuits 20, the PCB 30, the control unit 40, and the power supply circuit (not illustrated). The configurations of the COF circuits 20, the PCB 30, the control unit 40, and the power supply circuit are the same as those in the first embodiment.

4-1. Configuration of Organic EL Panel (Panel for Display Device)

The organic EL panel 10D according to the fourth embodiment is a panel that displays video, and is one of the components that constitute the organic EL display 100, as in the first embodiment. FIG. 14 is an enlarged view illustrating the portion enclosed by the broken line in FIG. 2.

Figure 14:
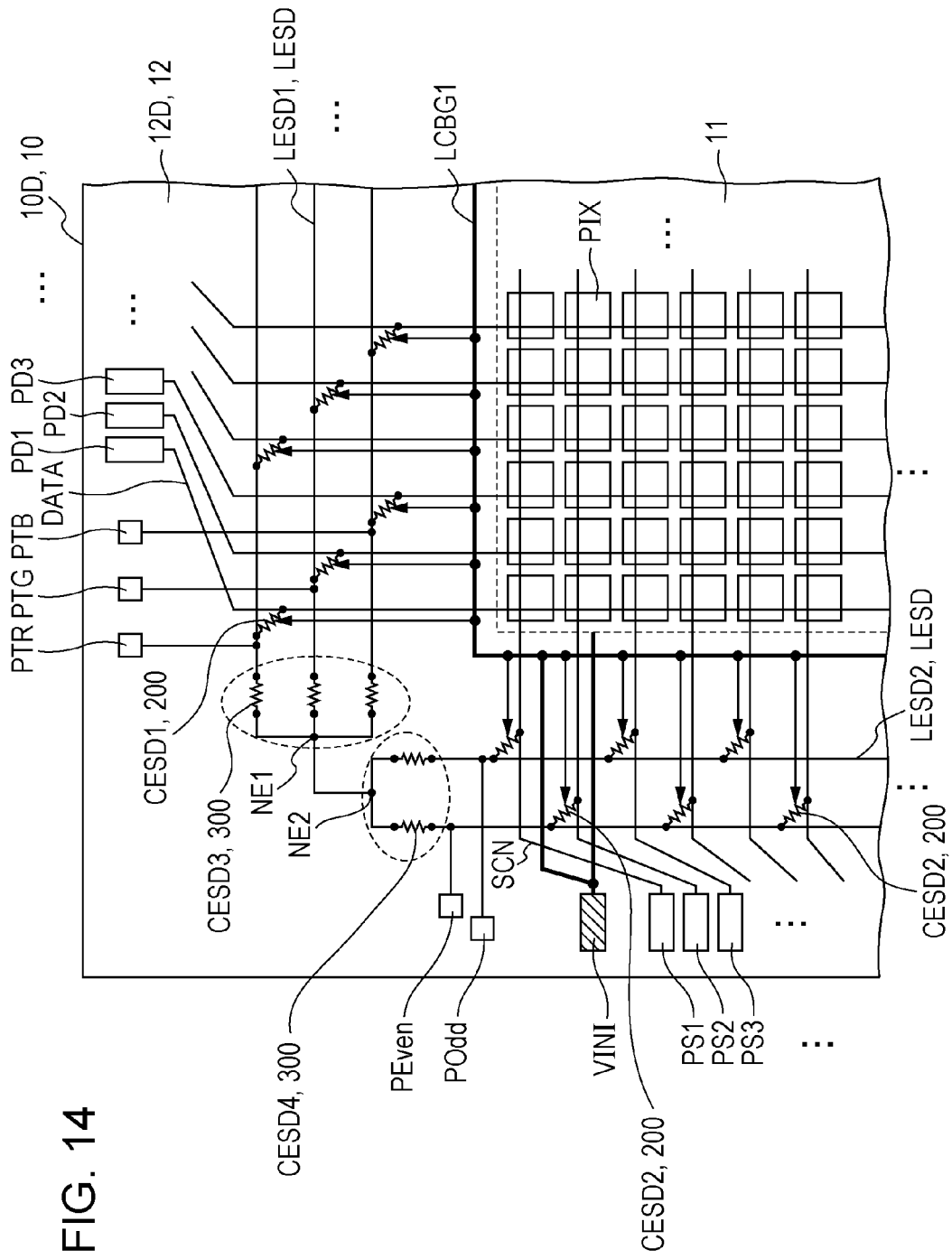
FIG. 14 is a partial enlarged view illustrating a portion of the panel for a display device according to the fourth embodiment.

As illustrated in FIG. 14, the organic EL panel 10D includes the display unit 11 and a circuit unit 12D (12). The configuration of the display unit 11 is the same as that in the first embodiment.

The circuit unit 12D includes wires and pads that are used for usual operation, and a test circuit used for an emission test. The configurations of the wires and pads used for usual operation are the same as those in the first embodiment.

As illustrated in FIG. 14, the test circuit includes the test pads, the ESD elements CESD1 and CESD2 for an emission test, and the ESD elements CESD3 and CESD4 (second resistance circuits) for connecting the plurality of ESD wires LESD (LESD1 and LESD2). The configurations of the ESD elements CESD1 to CESD4 are the same as those in the first embodiment.

The test pads according to the fourth embodiment include the test pad PTR, the test pad PTG, the test pad PTB, the test pad PEven, and the test pad POdd. The configurations of these test pads are the same as those in the first embodiment.

In the fourth embodiment, the test pad PBG1 according to the first embodiment is not provided, and the control line LCBG1 is connected to a pad VINI to which an initial voltage is supplied.

The pad VINI is a pad for supplying an initial voltage to the source terminal (node N2) of the driving transistor T5 of the display pixel PIX illustrated in FIG. 4. The initial voltage is input to the source terminal of the driving transistor T5 via the switching element T4.

4-2. Method for Setting Voltage

A method for setting a voltage of the organic EL panel 10D according to the fourth embodiment will be described with reference to FIG. 15.

(1) During Usual Operation

Figure 15:
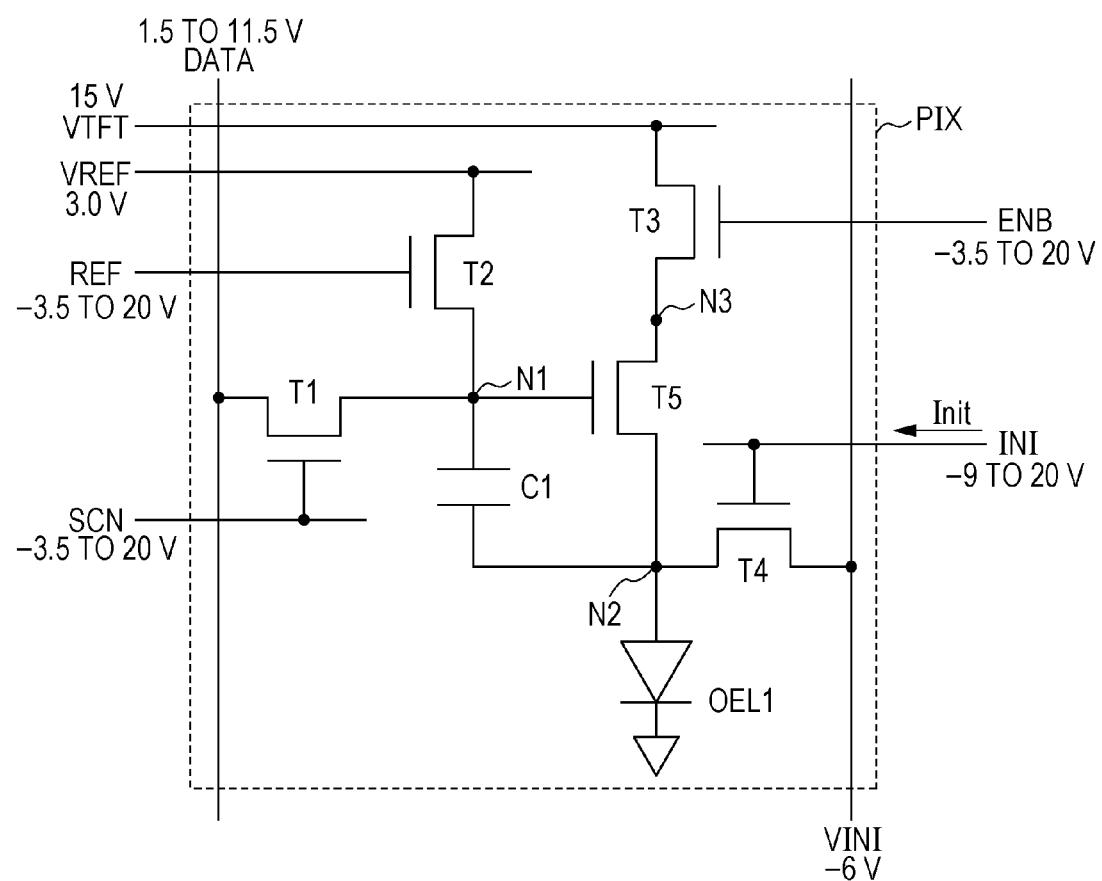
FIG. 15 is a diagram illustrating an example of a method for setting a voltage according to the fourth embodiment.

FIG. 15 is a diagram illustrating a method for setting a voltage of the display pixel PIX during usual operation in the fourth embodiment.

As illustrated in FIG. 15, during usual operation, in the ESD element CESD1, the voltage of the back-gate terminal (=VINI) is −6 V, and the voltage of the signal line DATA is 1.5 to 11.5 V. That is, the voltage of the control line LCBG1 (−6

V) is lower than the voltage of the signal line DATA (1.5 to 11.5 V), and thus the resistance of the ESD element CESD1 is high. Accordingly, the occurrence of a leak current can be suppressed when the voltage of the pad PD1 is supplied to the display pixel PIX.

(2) During Emission Test

During an emission test, for example, 10 V may be applied to the test pad PTR and 20 V may be applied to the pad VINI, as in the first embodiment. At this time, if an off voltage (for example, −5 V) is applied to the gate terminal of the switching element T4, the pad VINI and the node N2 are electrically separated from each other, and thus the voltage of the pad VINI does not affect the emission test. With such settings, the voltage of the control line LCBG1 (20 V) is higher than the voltage of the ESD wire LESD1 (10 V), and thus the resistance of the ESD element CESD1 becomes low. Accordingly, the voltage of the test pad PTR is supplied to the display pixel PIX.

4-3. Modification of Fourth Embodiment

In the fourth embodiment, the control line LCBG1 may be connected to a wire other than the power supply line connected to the pad VINI, for example, a power supply line connected to the pad VREF, depending on an application.

In the example illustrated in FIG. 15, the voltage applied to the signal line DATA of the selected display pixel PIX ranges from 1.5 V to 11.5 V during usual operation. Also, a voltage of 3 V, which is the voltage of the power supply line connected to the pad VREF, is applied to the back-gate terminal of the ESD element CESD1. In this case, in the range where the voltage applied to the signal line DATA is 3 V or more, the voltage is higher at the source terminal than at the back-gate terminal of the ESD element CESD1, Vbs<0 is satisfied, and a leak current can be reduced. However, in the range where the voltage applied to the signal line DATA is 1.5 V to 3 V, Vbs>0 is satisfied, and a leak current increases. However, in an application that mainly deals with an image mainly including a high-gradation display image (for example, a screen of a web site in which a white background color is often used), the voltage of the signal line DATA is almost 3 V or more.

Therefore, in such a case, a leak current hardly increases substantially, and no problems occur.

4-4. Advantages

In the organic EL panel 10D according to the fourth embodiment, the test pad PGB1 according to the first embodiment is not provided, and one of the pads used for usual operation is used as the test pad PBG1. Thus, it is not necessary to provide a dedicated test pad in control of the voltage of the back-gate terminal.

Further, in the organic EL panel 10D according to the fourth embodiment, a voltage for an emission test is applied to the display unit 11 via the ESD elements (electrostatic protection circuits) including back-gate-type transistors, as in the first to third embodiments. Accordingly, during an emission test, the resistance of the ESD elements can be decreased and a signal for an emission test can be normally input only by adjusting the voltage of the back-gate terminals, as in the first to third embodiments. Also, during usual operation, the resistance of the ESD elements can be increased and an increase in leak current can be suppressed. In this way, two advantages can be obtained at the same time.

Other Embodiments (1) In the above-described embodiments, a description has been given mainly of a case where an electrostatic protection circuit including back-gate-type transistors is applied for the signal lines DATA. Alternatively, the electrostatic protection circuit may be applied to the scanning lines SCN, or to both of the signal lines DATA and the scanning lines SCN. Also the electrostatic protection circuit may be applied to control lines REF, ENB, INI, and so forth.

(2) In the above-described embodiments, the individual elements (the control unit 40 and so forth) may be constituted by dedicated hardware or may be constituted by executing a software program suitable for the individual elements. The individual elements may be constituted by, with a program execution unit such as a central processing unit (CPU) or a processor, reading out and executing a software program recorded on a recording medium, such as a hard disk or a semiconductor memory. Here, the software that constitutes the display device according to the above-described embodiments is the following program.

That is, the program causes a computer (a device for testing a panel for a display device) to execute a step of performing a test of a panel for a display device by adjusting a voltage of an electrostatic circuit control line so that the threshold voltage of a back-gate-type transistor increases.

A description has been given of, based on the embodiments, a panel for a display device, a display device, and a method for testing the panel according to one or a plurality of aspects, but the present disclosure is not limited to these embodiments. Without deviating from the gist of the present disclosure, various modifications of the embodiments that a person skilled in the art conceives, and a combination of elements in difference embodiments may be included in the scope of one or a plurality of aspects.

The present disclosure is applicable to, for example, a display device such as an organic EL display.

What is claimed is:

1. A panel for a display device, comprising:
   a display unit including a plurality of display pixels;
   an electrostatic protection wire being connected to a test pad, the test pad being provided to receive a test signal;
   a wire being connected to the display pixels;
   an electrostatic protection circuit that connects the electrostatic protection wire and the wire being connected to the display pixels, the electrostatic protection circuit including a back-gate-type transistor that has a gate electrode, a drain electrode being short-circuited with the gate electrode, and a back-gate electrode; and
   an electrostatic protection circuit control line including a first end and a second end, the first end being connected to the back-gate electrode of the back-gate-type transistor.

2. The panel according to claim 1, wherein the back-gate-type transistor is a bottom-gate-type transistor.

3. The panel according to claim 1, further comprising:
   a back-gate pad being connected to the second end of the electrostatic protection circuit control line.

4. The panel according to claim 3, further comprising:
   a first resistance circuit that connects the back-gate pad and the test pad.

5. The panel according to claim 1, wherein the second end of the electrostatic protection circuit control line is connected to, during usual operation, a pad to which a certain voltage lower than a voltage of the wire being connected to the display pixels is applied.

6. The panel according to claim 1,
   the electrostatic protection wire being one of a plurality of electrostatic protection wires,
   the panel further comprising:
   a second resistance circuit that connects the plurality of electrostatic protection wires.

7. The panel according to claim 1, wherein the display pixels each include an organic electroluminescence element.

8. A display device including the panel according to claim 1.

9. A method for testing the panel according to claim 1, the method comprising steps of:
   (a) applying a back-gate voltage for an emission test to the back-gate electrode of the back-gate-type transistor; and
   (b) applying the test signal to the wire being connected to the display pixels.

10. The method according to claim 9, wherein in the applying step (a), a certain voltage higher than a voltage of the test signal being applied to the test pad is applied to the electrostatic protection circuit control line as a voltage of the back-gate electrode.

11. The method according to claim 9, wherein the applying step (a) and the applying step (b) are performed before an integrated circuit is mounted on the panel.

12. The panel according to claim 1, wherein the drain electrode of the back-gate-type transistor is connected to the electrostatic protection wire, and a source electrode of the back-gate-type transistor is connected to the wire being connected to the display pixels.

13. The panel according to claim 12, wherein the electrostatic protection circuit includes a second back-gate-type transistor that has a second gate electrode, a second drain electrode being short-circuited with the second gate electrode, a second back-gate electrode, and a second source electrode, the second source electrode is connected to the electrostatic protection wire, the second drain electrode is connected to the wire being connected to the display pixels, and the first end of the electrostatic protection circuit control line is connected to the second back-gate electrode.

* * * * *